UNITED STATES PATENT OFFICE.

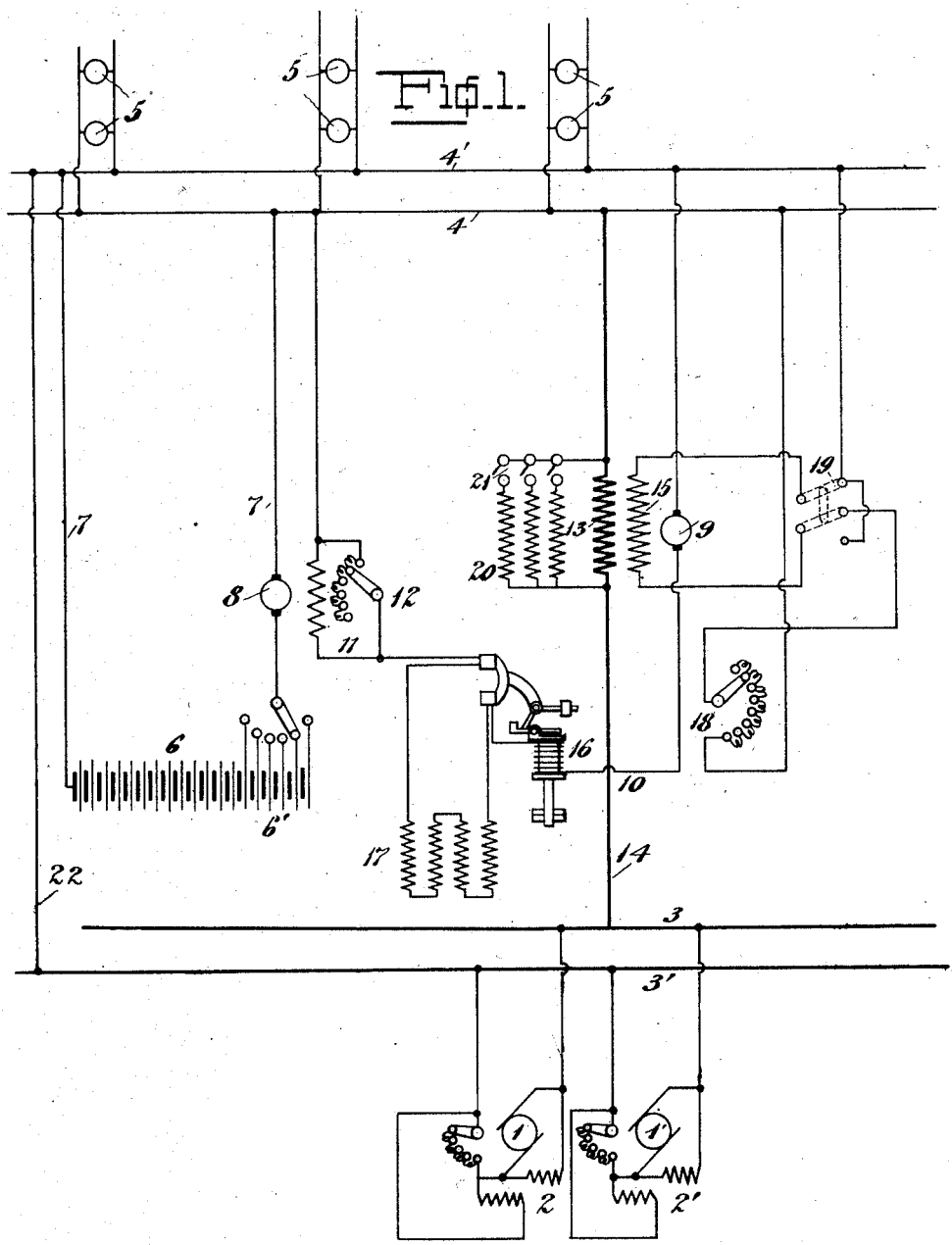

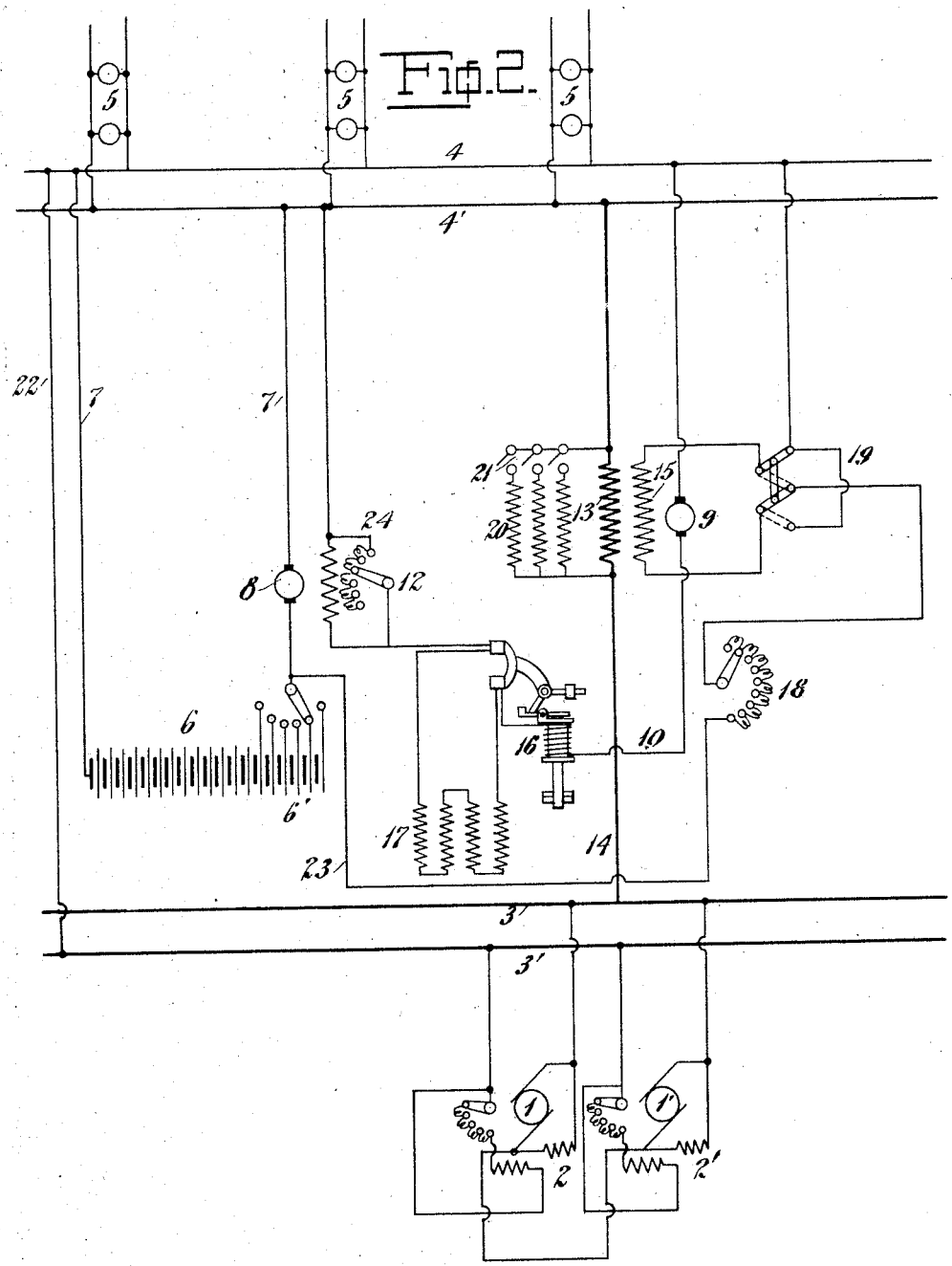

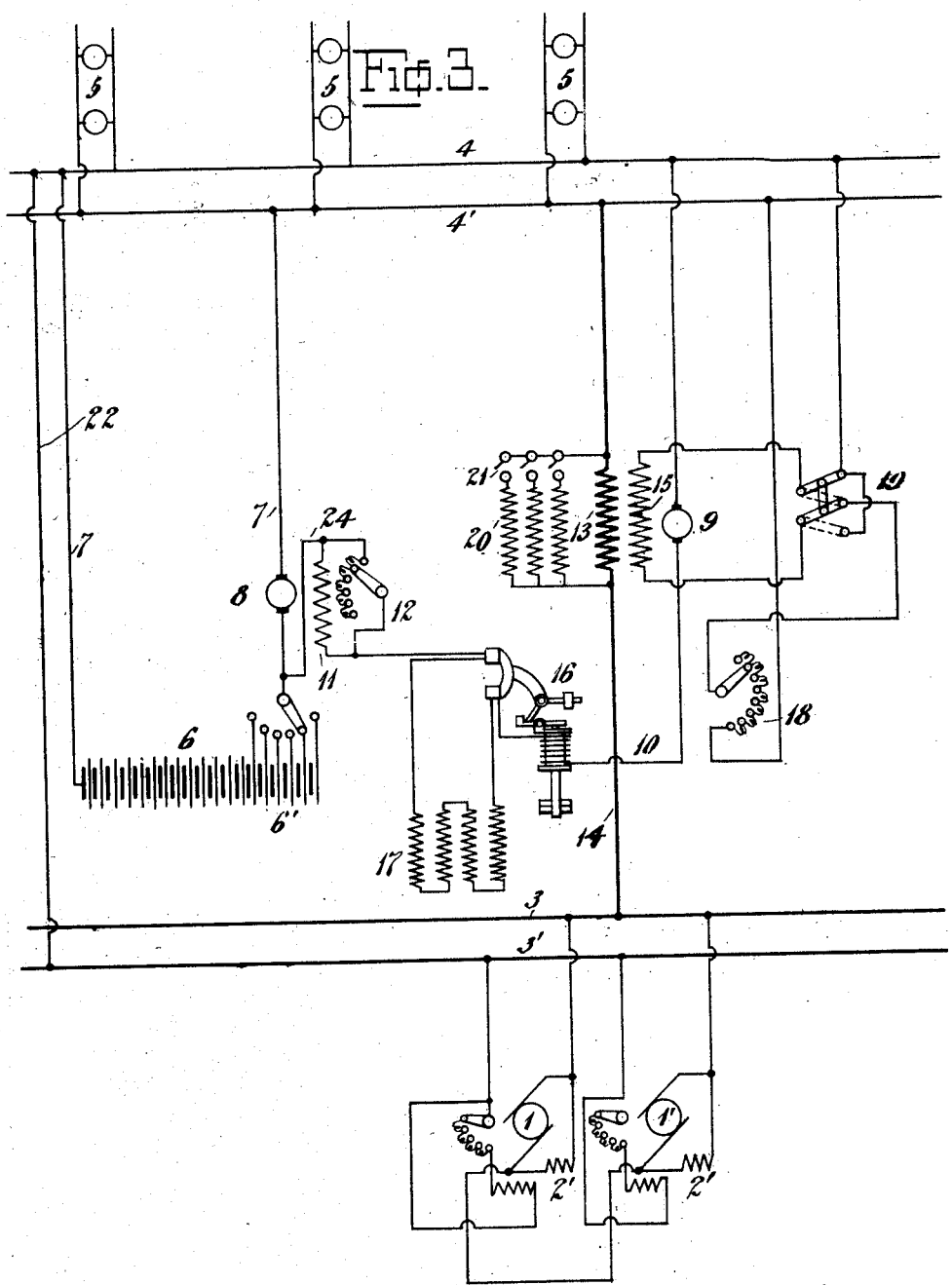

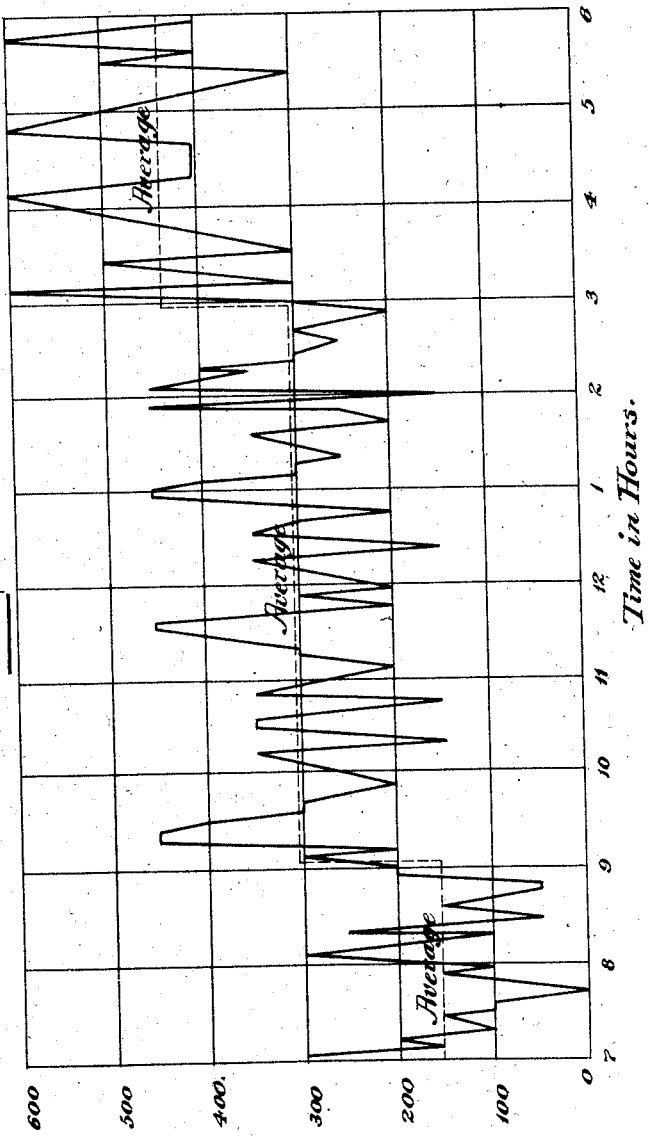

ALBERT S. HUBBARD, OF BELLEVILLE, NEW JERSEY, ASSIGNOR TO GOULD STORAGE BATTERY COMPANY, A CORPORATION OF NEW YORK.

SYSTEM OF ELECTRICAL DISTRIBUTION.

No. 885,755.        Specification of Letters Patent.        Patented April 28, 1908.

Original application filed June 24, 1903, Serial No. 162,845. Divided and this application filed August 24, 1905. Serial No. 275,601.

*To all whom it may concern:*

Be it known that I, ALBERT S. HUBBARD, a citizen of the United States, residing in Belleville, in the county of Essex and State of New Jersey, have invented certain new and useful Improvements in Systems of Electrical Distribution, of which the following is a specification.

This invention relates to improvements in systems of distribution, and particularly to a generating, storing, and distributing system involving the use of a storage apparatus, a booster and regulating devices therefor.

This application is a division of my application Serial No. 162,845, filed June 24th, 1903 and a continuation of my application No. 23,013, filed Nov. 23d, 1904.

The object of the present invention is, in a distribution system of the character above described, to provide means to accommodate and regulate all parts of the system in accordance with changes in average load occurring during a given period, such for instance as take place in the course of a day, during portions of which the average demand upon the generators is light, and other portions when the demand is heavier, and still other portions when the average demand is at the maximum; and to preserve the automatic action of the regulating devices in each of the average load changes.

In systems of the character referred to, it is usually desired to have the battery float at a given average load and to charge and discharge with fluctuations below and above that load, this result being obtained by means of a booster which responds to the load fluctuations. This regulating effect of the booster is generally obtained by causing its field to be responsive to the load fluctuations, so that with a current in the booster field winding proportional to the average load, the booster will cause the battery to float. When there is a considerable variation in the average load, as for instance, in systems used for traction purposes in which the average load may be 150 amperes for one portion of the day, 300 amperes for another portion and 450 amperes for still another portion, the ordinary regulating devices do not permit of the range and fineness of regulation required to accommodate the system to these different average loads.

My invention has for its object to provide means whereby such regulation may be obtained at each of the different average loads which a system may be called upon to sustain.

The accompanying drawing represents a system of installation embodying my invention.

Figure 1 represents such a system diagrammatically. Figs. 2 and 3 show respectively modifications thereof. Fig. 4 is a chart representing, as an example, the changes in load occurring during the different portions of a day from seven a. m. to six p. m., and the changes in average load during the same period.

Referring to Fig. 1: 1, 1' represent the dynamos with their field coils 2, 2', the said dynamos being connected to the bus-bars 3, 3'. 4, 4' represent the mains for supplying a lighting or power circuit including translating devices such as 5. The storage battery 6, having regulating or "end" cells 6', is connected across the mains 4, 4' in a circuit 7, which includes the armature 8 of the booster. The booster armature is driven at desired speed by suitable connection from any convenient source of power. A counter-electromotive force generator such as a motor, also connected to run at desired speed, has its armature 9 connected in a circuit 10, which includes therein the field magnet coil 11 of the booster. This coil 11, therefore, always has current that is proportional to the difference between, or the resultant of, the potential differences across the circuit 4 4' and across the armature 9. A regulating rheostat 12 is provided for securing the desired adjustments of this field. A circuit-breaker 16 is provided in this circuit and a resistance 17 is connected across the break of the circuit-breaker. The field-magnet of the motor or counter-electromotive force generator is provided with a coil 13 connected so as to be traversed by the current supplied by the generator, being included, for example, in a connection 14 between a dynamo bus-bar 3 and the corresponding side 4 of the consumption or work circuit. The effect of this winding can be varied by shunts 20 and shunt switches 21. The field-magnet of the counter-electromotive-force generator is also provided with a second winding 15 which by means of a reverser 19 may be made to operate cumulatively or differentially with the coil 13. A rheostat 18 is provided for this winding by means of which the same may be adjusted and controlled. Said winding 15 may be connected in a circuit across the mains 4, 4', as shown in Figs. 1 and 3, or it may be connected to the battery circuit as shown in Fig. 2.

In the operation of the system the electromotive force furnished by the booster, as adjusted by the counter-electromotive-force generator 9, rheostat 18, reverser 19 and shunts 20, is just sufficient to balance the difference between the line electromotive force and the battery electromotive-force with the desired average load on the generators 1, 1', at any period. As the action of the counter-electromotive-force generator 9 is determined by the action of its fields, the electromotive force of the booster will be correspondingly fixed or determined to permit the battery to charge from and discharge to the line in accordance with the changes from the average generator load. This effect of the counter-electromotive-force generator is due to the fact that its strength of field is responsive to the generator load, since its field magnet coil is in series in the generator circuit. Every change of current, therefore, in the regulating coil, by varying the counter electromotive force of the armature 9 varies the resultant of the opposing potential differences, which variation produces a corresponding variation of current in the booster field winding. Thus, assuming the battery to be charging and its electromotive force equal to that of the line, then as the load on the generator increases the counter-electromotive-force increases and the magnetization of the booster field is correspondingly changed, causing the battery to stop charging and to float or discharge. It will be understood that the battery electromotive force may be equal to greater or less than the line electromotive force as desired, the booster being designed and adjusted to correspond.

The function of the coils 13 and 16 on the field of the counter-electromotive-force machine is as follows: Assuming the apparatus to be adjusted so that with the normal or average load in amperes for a given portion of the day passes through coil 13, the power of coil 15 is so adjusted by rheostat 18 and coils 20 that the battery and booster combination is "floating", that is, the battery neither charges nor discharges. In this case, increases of current through coil 13, due to rise of load, cause the field of the booster to be excited so that the booster electromotive-force assists the battery to discharge to the line; while decreases of current in the same coil, due to drop in the load, assists battery charge. The function of coil 13 is to put a limit on the change of generator load so that the same can not vary more than a predetermined amount.

By suitable adjustment of the strength of coils 13 or 15, or both, the number of amperes carried by the generators 1, 1', can be increased or decreased according to the number of generators running and the average load existing at that time. For instance, on the load curve shown in Fig. 4, the average load from 7 a. m. to 9 a. m. is sufficiently light to enable one generator to be run. The strength of coil 15 is, therefore, adjusted so that with an average current of 150 amperes through the coil 13, the battery will "float." From nine a. m. to three p. m. for instance (see Fig. 4) the average load has increased to 300 amperes, sufficient to require a second generator to be connected. The shunt coil 15 and coils 20 under these conditions are adjusted so that the 300 amperes in coil 13 will cause the battery to "float." From three p. m. to six p. m., the average load (see Fig. 4) has increased to 450 amperes, requiring a third generator to be connected in circuit. At this time it may be desirable to give the battery a slight overcharge which can be accomplished by adjusting the coil 15 so that with say 460 amperes through coil 13 the battery will "float."

The action of coil 15 under the various adjustments is due to the fact that the armature 9 of the counter-electromotive-force machine being driven at a known speed, or at a speed subject to known changes, gives rise to a counter-electromotive-force due to the strength of its field as caused by the current in coil 13; so that if a current be caused to circulate in coil 15 such that the magnetism of the field of armature 9 due to this coil is of the same sign as that caused by coil 13, then less current will be required in coil 13 to cause the voltage of 9 to be of the proper value to cause the voltage of the battery 6, plus or minus that of the booster 8, to be equal to that of the line 4, 4', and the load on the generators 1, 1', will be less. Again, if coil 15 be cut out or the direction of current therein reversed by means of the reverser 19, a greater amount of current must circulate through coil 13 to bring the voltage of 9 up to the proper point, so that in this case the load on generators 1, 1' will be greater. Thus the armature 9 serves to control the current in the booster field winding and is itself automatically affected by its regulating coil 13 which is responsive to changes in generator load; but it is also affected by current in its field coil 15. The manual adjustment of the current in this coil 15 alters the effect of coil 13 upon armature 9 and, therefore, upon the booster field winding which that armature controls, so that a given regulating current in the booster field winding will be obtained with a different strength of current in coil 13.

It will be understood that this regulating current may be of any predetermined value, dependent upon the desired battery action and voltage. If the battery voltage be equal to the line voltage, the current in the booster field winding will be zero at the average load to permit the battery to float. If other relations of the battery and line voltage be adopted, suitable adjustments will be made to obtain the proper current strength in the booster field, so that the battery voltage plus or minus the booster voltage will be equal to the line voltage at the average load: but in any case the apparatus may always be adjusted to produce zero current in the booster field for any desired current in the regulating coil, this being essential to the maintenance of the desired automatic regulation.

Rheostat 18 permits of a certain range in adjustment and greater adjustments can be obtained by means of the shunts 20. The rheostat 12 is provided so that increased external load on 4, 4', can be divided in different ratios between the battery and the generator, that is, its effect is to change the limits between which the generator load is permitted to vary.

The circuit breaker 16 and the resistance 17 are provided so that upon an increase of current in circuit 10 to the desired limit, the circuit-breaker 16 will open and the resistance 17 being thus cut into circuit reduces the current of the line 10 and protects the field 11 and the counter-electromotive-force generator 9.

In the modification shown in Fig. 2, the coil 15 is connected to the battery circuit through a connection 23, instead of being connected directly across the mains 4, 4', as in Fig. 1. By this arrangement the generators are made more responsive to battery requirements and conditions. In Fig. 3 is shown another modification in which the circuit 10 of the armature 9 of the counter-electromotive-force machine, after leaving the booster coil 11, is connected to the battery circuit; this arrangement causing the counter-machine 9 to be more responsive to the condition of the battery. The apparatus may be made to operate with any average load on the generators, by suitably adjusting the strength and direction of current in the winding 15, and by the adjustment of shunts 20 to the winding 13. These examples show that the apparatus may be made to operate in connection with a battery of any voltage, the machine and windings being suitably proportioned.

Having thus described my invention, the following is what I claim as new therein and desire to secure by Letters Patent:

1. In a system of electrical distribution, the combination with a work circuit, generators for supplying the same, a storage battery and booster connected to the work circuit in parallel with the generators, a field-winding for said booster, a circuit including said booster field-winding connected in parallel with the generators and having substantially constant E. M. F. in one direction, a counter E. M. F. generator in said circuit, means responsive to load fluctuations in the generator circuit for varying said counter E. M. F. and manually adjustable means for assisting or opposing the effect of the load fluctuations on the counter E. M. F. generator.

2. In a system of electrical distribution, the combination with a work circuit, generators for supplying the same, a storage battery connected in parallel with the work circuit, a booster in series to the battery, a field-winding for said booster, a circuit including said field-winding connected across the work circuit, a counter E. M. F. generator in said circuit, a field-winding for said counter E. M. F. generator in series with the main generator, and a second field-winding for said counter E. M. F. generator, and means for causing said second field-winding to be cumulative or differential in respect to the other field-winding.

3. In a system of electrical distribution, the combination with a work circuit, generators supplying the same, auxiliary devices comprising a storage battery connected to the work circuit and a booster for regulating the battery action, of a field-winding for said booster, means for causing variations of current therein in accordance with the resultant of opposing potential differences, said means comprising a regulating coil responsive to generator load changes, apparatus acted upon by said regulating coil to vary said resultant of potential differences, and an independent manually adjustable means for varying said resultant.

4. In a system of electrical distribution, the combination of a work circuit, a generator supplying the same, a storage battery in parallel with the generator and a booster in series with the battery, of a circuit connecting the battery and one side of the mains, a field-winding for the booster in said circuit, said field-winding being in parallel relation with the booster armature, an apparatus included in said circuit for regulating the effect on the booster field-winding between a positive and negative maximum value, a regulating coil in series with the generator, and manually adjustable means acting jointly with said regulating coil on said apparatus to control the same.

5. In a system of electrical distribution, the combination of a work circuit, a generator supplying the same, auxiliary devices comprising a storage battery and booster in series connected to the work circuit in parallel with the generators, of a field-winding for the booster, a circuit connected in parallel with the main circuit and including said field-winding therein, automatically operating apparatus for causing said circuit to be neutral under normal loads and to have a positive and negative E. M. F. under increase and decrease of load respectively, and a regulating coil responsive to generator loads and manually adjustable means coöperatively acting upon said apparatus.

6. In a system of electrical distribution, the combination of the work circuit, generators for supplying the same, auxiliary devices comprising a storage battery connected to the work circuit and a booster for regulating the battery action, means to adjust the load relation between the generator and the auxiliary devices to cause the generator to carry a given average load and the auxiliary devices to respond to fluctuations in said load, a field winding for the booster and means responsive to said fluctuation to vary the excitation of said booster field winding and means for adjusting the system to different load capacities, said means adjustable to act cumulatively or differentially with said responsive means or to be inactive.

7. In a system of electrical distribution, the combination with a work circuit, generators supplying the same, auxiliary devices comprising a storage battery connected to the work circuit and a booster for regulating the battery action, a circuit of substantially constant electromotive force including the booster field therein, a source of counter-electromotive force in said circuit, means responsive to fluctuations in the load on the generator for regulating said counter-electromotive force and other means adjustable to act cumulatively or differentially with the said responsive means or to remain inactive whereby the system may be adjusted to different load capacities.

8. In a system of electrical distribution, the combination of a work circuit, a generator supplying the same, auxiliary devices comprising a storage battery and booster in series connected to the work circuit in parallel with the generators, of a field-winding for the booster, a circuit connected in parallel with the main circuit and including said field-winding therein, automatically operating apparatus for causing said circuit to be neutral under normal loads and to have a positive and negative E. M. F. under increase and decrease of load respectively, and two controlling means coöperatively acting upon said apparatus, one of said means comprising a regulating coil responsive to changes in generator load and the other being manually adjustable to regulate and vary the effect of said coil.

9. A system of electrical distribution comprising a generator, a storage battery, and a work circuit connected therewith, a booster to regulate the battery action, a counter-electromotive force generator having the booster field magnet in its armature circuit, field windings for said counter-electromotive force generator, one of which is responsive to variations in load on the generator, and the other of which includes a reversing switch in its circuit whereby its action may be cumulative or differential with regard to the first winding.

10. A system of electrical distribution, comprising a generator, a storage battery, and a work circuit connected therewith, a booster to regulate the battery action, a counter-electromotive force generator having the booster field-magnet in its armature circuit, field windings for said counter-electromotive force generator, one of which is responsive to variations in load on the generator, the other of which is connected across the work circuit and provided in its circuit with a reverser.

11. A system of electrical distribution comprising a generator, a storage battery, and a work circuit connected therewith, a booster to regulate the battery action, a counter-electromotive force generator having the booster field-magnet in its armature circuit, field windings for said counter-electromotive force generator, one of which is responsive to variations in load on the generator, the other of which is connected across the work circuit and provided in its circuit with a reverser and an adjustable resistance.

12. A system of electrical distribution comprising a generator, a storage battery, and a work circuit connected therewith, a booster to regulate the battery action, a counter-electromotive force generator having the booster field-magnet in its armature circuit, field windings for said counter-electromotive force generator, one of which is responsive to variations in load on the generator and is provided with an adjustable resistance, and the other of which includes a reversing switch in its circuit whereby its action may be cumulative or differential with regard to the first winding.

13. A system of electrical distribution, comprising a generator, a storage battery and a booster in the battery circuit, a counter-electromotive force generator connected in circuit with the booster field magnet and responsive to load fluctuations on the generator to affect the booster field strength on increase of load and permit battery discharge, and to permit battery charge on decrease of load, and a regulating device for the counter-electromotive force generator to adjust the same for different average loads, said regulating device comprising a second winding on the counter-electromotive force generator.

14. A system of electrical distribution, comprising a work circuit, a generator, a storage battery and booster, a counter-electromotive force generator having its armature in circuit with the booster field, two field-magnet coils for the counter-electromotive force generator, one of said coils connected in the generator circuit and responsive to load fluctuations therein, the other of said field-magnet coils connected with any convenient source of substantially constant electro-motive force, means to reverse the direction of current circulating in said second coil and means for regulating the effect of each of said coils.

ALBERT S. HUBBARD.

Witnesses:
HENRY C. WORKMAN,
WM. P. HAMMOND.